(No Model.)
J. P. JACKSON.
GAS GENERATOR.
No. 497,097. Patented May 9, 1893.
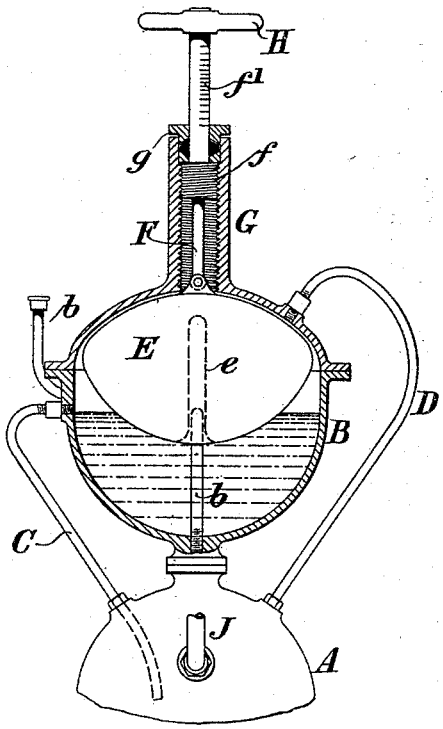
Witnesses:
George Baumann
John Revell
Inventor:
John P. Jackson
By his Attorneys
Howson and Howson

UNITED STATES PATENT OFFICE.

JOHN P. JACKSON, OF LIVERPOOL, ENGLAND.

GAS-GENERATOR.

SPECIFICATION forming part of Letters Patent No. 497,097, dated May 9, 1893.

Application filed December 10, 1890. Serial No. 374,137. (No model.) Patented in England February 27, 1890, No. 3,117; in France June 4, 1890, No. 206,135; in Germany June 10, 1890, No. 56,794; in Victoria July 16, 1890, No. 7,887; in South Australia July 17, 1890, No. 1,655; in New South Wales July 18, 1890, No. 2,344; in Queensland July 19, 1890, No. 1,138; in New Zealand July 26, 1890, No. 4,493; in Austria-Hungary January 2, 1891, No. 41,347 and No. 69,036, and in West Australia October 6, 1891, No. 298.

*To all whom it may concern:*

Be it known that I, JOHN PERKINS JACKSON, engineer, a subject of the Queen of Great Britain and Ireland, and residing at 63 Duke Street, Liverpool, in the county of Lancaster, England, have invented certain Apparatus for the Production or Generation of Carbonic-Acid Gas, (for which I have obtained Letters Patent in Great Britain, No. 3,117, dated February 27, 1890; in France, No. 206,135, dated June 4, 1890; in Germany, No. 56,794, dated June 10, 1890; in Austria-Hungary, No. 41,347 and No. 69,036, dated January 2, 1891; in New South Wales, No. 2,344, dated July 18, 1890; in New Zealand, No. 4,493, dated July 26, 1890; in Queensland, No. 1,138, dated July 19, 1890; in South Australia, No. 1,655, dated July 17, 1890; in Victoria, No. 7,887, dated July 16, 1890, and in West Australia, No. 298, dated October 6, 1891,) of which the following is a specification.

My invention has for its object to provide a simple and efficient apparatus for the production or generation of carbonic acid gas by the mixture of a suitable carbonate and an acid, means being provided for supplying the acid to the chamber or vessel containing the carbonate in regulated quantities to take the place of that consumed until there is no strength left in the carbonate to generate gas.

The accompanying drawing represents in sectional elevation a gas generating apparatus constructed according to my invention A being the upper portion of the vessel which contains the carbonate and in which the gas is generated and B the vessel containing the acid for mixing with the said carbonate. The vessel B is supplied with acid as required by a pipe or passage $b$ which can be closed gas tight by any suitable means for instance by a screw cap. The vessel A is preferably made with spherical ends and the vessel B which is attached to the top of the vessel A is also made with a spherical lower part.

The vessels A and B are in communication with each other by pipes C and D the acid from the vessel B passing into the vessel A through the pipe C while the pipe D admits gas from the vessel A to the vessel B above the surface of the acid therein so as to maintain an equal pressure in the two vessels. In the vessel B is an acid displacer E preferably with a spherical lower part to exactly fit the lower part of the vessel B and capable of being depressed by a stem F secured to a screwed plug $f$ engaging with an internal screw in the neck G of the vessel B. The upper end $f'$ of this stem passes through a stuffing box or gland $g$ in the neck G and is provided with a handle H or equivalent device by means of which the screwed plug $f$ can be turned in the neck and thereby operate as required the displacer E.

$b$ is a guide rod entering a guide tube $e$ in the displacer E. By lowering the said displacer in the vessel B a portion of the acid is displaced and passes by gravity through the pipe C into the vessel A wherein it mixes with the carbonate contained therein whereby carbonic gas is generated and the said gas passes from the said vessel by the pipe J into the aerated water cylinder. On the part $f'$ of the stem there may be marked a scale for the purpose of enabling a regulated quantity of acid to be displaced at each depression of the displacer and for indicating the quantity of acid remaining in the vessel B.

Having now particularly described and ascertained the nature of my said invention and in what manner the same is to be performed, I declare that what I claim is—

For generating carbonic acid gas, the combination of a vessel A for containing a carbonate, with a vessel B, for containing acid, provided with a neck having an internal screw-thread, and a stuffing box at the top, an acid displacer provided with a guide tube, a guide rod secured to the vessel B to enter the guide tube, pipes connecting the two vessels, a stem F connected at one end to the acid displacer and at the other to a stem passing out through the said stuffing box, and a screw plug $f$ on the stem F, working in the threaded neck of the vessel B, all substantially as and for the purposes set forth.

In testimony whereof I have signed my name to this specification in the presence of two subscribing witnesses.

J. P. JACKSON.

Witnesses:
ARTHUR E. HORROCKS,
A. L. RYLAND,
*Both Clerks with Arthur S. Mather, Notary Public, Liverpool.*